United States Patent
Zhang

(10) Patent No.: US 11,716,399 B2
(45) Date of Patent: Aug. 1, 2023

(54) NWDAF NETWORK ELEMENT SELECTION METHOD AND APPARATUS, ELECTRONIC DEVICE, AND READABLE STORAGE MEDIUM

(71) Applicant: Tencent Technology (Shenzhen) Company Limited, Guangdong (CN)

(72) Inventor: Zhuoyun Zhang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 21 days.

(21) Appl. No.: 17/451,738

(22) Filed: Oct. 21, 2021

(65) Prior Publication Data

US 2022/0046101 A1 Feb. 10, 2022

Related U.S. Application Data

(63) Continuation of application No. PCT/CN2020/118371, filed on Sep. 28, 2020.

(30) Foreign Application Priority Data

Nov. 6, 2019 (CN) .......................... 201911078276.0

(51) Int. Cl.
*H04L 67/51* (2022.01)
*H04L 41/147* (2022.01)
*H04L 67/60* (2022.01)
*H04W 4/20* (2018.01)

(52) U.S. Cl.
CPC ............ *H04L 67/51* (2022.05); *H04L 41/147* (2013.01); *H04L 67/60* (2022.05)

(58) Field of Classification Search
CPC ....... H04L 67/05; H04L 41/147; H04L 67/60; H04W 4/20
See application file for complete search history.

(56) References Cited

U.S. PATENT DOCUMENTS

2021/0377754 A1* 12/2021 Marquezan ......... H04L 41/0853
2022/0014599 A1* 1/2022 Zhang .................... H04L 67/60
(Continued)

FOREIGN PATENT DOCUMENTS

| CN | 109600768 | 4/2019 |
|---|---|---|
| CN | 110798360 | 2/2020 |

(Continued)

OTHER PUBLICATIONS

Supplementary European Search Report dated Jun. 9, 2022 in Application No. 20885260.8, pp. 1-11.
(Continued)

*Primary Examiner* — Shirley X Zhang
(74) *Attorney, Agent, or Firm* — ArentFox Schiff LLP

(57) ABSTRACT

Aspects of the disclosure provide methods and apparatuses for network data analytics. In some examples, an apparatus includes processing circuitry. The processing circuitry transmits a network data analytics function (NWDAF) service discovery request to a network repository function (NRF) network element. The NWDAF service discovery request indicates a requested network data analysis service. The processing circuitry receives an NWDAF service discovery response in response to the NWDAF service discovery request. The NWDAF service discovery response includes performance parameter information of one or more NWDAF network elements for the requested network data analysis service. Further, the processing circuitry selects, according to the performance parameter information of the one or more NWDAF network elements for the requested network data analysis service, a target NWDAF network element used for providing the requested network data analysis service, and transmits an NWDAF service request to the target NWDAF network element.

20 Claims, 5 Drawing Sheets

(56) References Cited

U.S. PATENT DOCUMENTS

| | | | |
|---|---|---|---|
| 2022/0060388 A1* | 2/2022 | Li | H04L 41/0816 |
| 2022/0321423 A1* | 10/2022 | Norrman | H04L 41/0853 |

FOREIGN PATENT DOCUMENTS

| | | | |
|---|---|---|---|
| EP | 3675549 A1 | 7/2020 | |
| WO | WO 2019/158777 A1 | 8/2019 | |
| WO | WO 2019/197467 A1 | 10/2019 | |

OTHER PUBLICATIONS

3GPP TR 23.791: "3rd Generation Partnership Project; Technical Specification Group Services and System Aspects; Study of Enablers for Network Automation for 5G (Release 16)", 3GPP TR 23.791 V1.1.0, Jan. 1, 2018 (Jan. 1, 2018), pp. 1-102.

Nokia et al: "Corrections for analytics exposure framework related parameters", 3GPP Draft; S2-1908038-REV-S2-1907674-Framework-Parameters-23288-100, 3rd Generation Partnership Project (3GPP), Mobile Competence Centre ; 650, Route Des Lucioles ; F-06921 Sophia-Antipolis Cedex ; F vol. SA WG2, Sapporo, Japan; Jun. 24, 2019-Jun. 28, 2019, Jun. 27, 2019.

International Search Report dated Dec. 31, 2020 in PCT Application No. PCT/CN2020/118371 (with English Translation) (6 pages).

Written Opinion dated Dec. 31, 2020 in PCT Application No. PCT/CN2020/118371 (4 pages).

Nokia et al. "Corrections to general and framework parts of analytics", SA WG2 Meeting #135, S2-1909193, Oct. 18, 2019 (9 pages).

Nokia et al. "Miscellaneous editorial corrections", SA WG2 Meeting #134, S2-1908177, Jun. 28, 2019 (18 pages).

* cited by examiner

NWDAF NETWORK ELEMENT SELECTION METHOD AND APPARATUS, ELECTRONIC DEVICE, AND READABLE STORAGE MEDIUM

RELATED APPLICATIONS

This application is a continuation of International Application No. PCT/CN2020/118371, entitled "NWDAF NETWORK ELEMENT SELECTION METHOD AND APPARATUS, ELECTRONIC DEVICE, AND READABLE STORAGE MEDIUM" and filed on Sep. 28, 2020, which claims priority to Chinese Patent Application No. 201911078276.0, filed on Nov. 6, 2019 and entitled "NWDAF NETWORK ELEMENT SELECTION METHOD AND APPARATUS, ELECTRONIC DEVICE, AND READABLE STORAGE MEDIUM". The entire disclosures of the prior applications are hereby incorporated by reference in their entirety.

FIELD OF THE TECHNOLOGY

This application relates to the field of communication technologies including an NWDAF network element selection method and apparatus, an electronic device, and a computer readable storage medium.

BACKGROUND OF THE DISCLOSURE

For network automation for 5G (eNA) of 3GPP R16, network data analytics function (NWDAF) can be used. The NWDAF is a very important network function for implementing network intelligence.

In some examples (e.g., the eNA study of R16), for different scenarios, certain information associated with NWDAF can be defined. For example, the information associated with NWDAF in a scenario can include from which network functions the NWDAF needs to collect data, to which network functions the analysis results by the NWDAF need to be transmitted, and the like.

SUMMARY

Aspects of the disclosure provide methods and apparatuses for network data analytics. In some examples, an apparatus includes processing circuitry. The processing circuitry transmits a network data analytics function (NWDAF) service discovery request to a network repository function (NRF) network element. The NWDAF service discovery request indicates a requested network data analysis service. The processing circuitry receives an NWDAF service discovery response in response to the NWDAF service discovery request. The NWDAF service discovery response includes performance parameter information of one or more NWDAF network elements for the requested network data analysis service. Further, the processing circuitry selects, according to the performance parameter information of the one or more NWDAF network elements for the requested network data analysis service, a target NWDAF network element used for providing the requested network data analysis service, and transmits an NWDAF service request to the target NWDAF network element.

Some aspects of the disclosure provide another apparatus including processing circuitry. The processing circuitry receives a network data analytics function (NWDAF) service discovery request associated with an NWDAF service request network element. The NWDAF service discovery request indicates a requested network data analysis service. The processing circuitry transmits an NWDAF service discovery response in response to the NWDAF service discovery request. The NWDAF service discovery response comprises performance parameter information of one or more NWDAF network elements for the requested network data analysis service. The performance parameter information of the one or more NWDAF network elements is used to select a target NWDAF network element from the one or more NWDAF network elements to provide the requested network data analysis service.

Method, apparatus and non-transitory computer-readable storage medium counterpart embodiments are contemplated. Additional aspects and advantages of this disclosure will be given in the following description.

BRIEF DESCRIPTION OF THE DRAWINGS

To describe the technical solutions in embodiments of this disclosure more clearly, the following briefly describes the accompanying drawings required for describing the embodiments of this disclosure.

DESCRIPTION OF EMBODIMENTS

The following describes embodiments of this disclosure in detail. Examples of the embodiments are shown in the accompanying drawings, and same or similar reference signs in all the accompanying drawings indicate same or similar components or components having same or similar functions. The embodiments that are described below with reference to the accompanying drawings are exemplary, and are only used to interpret this disclosure and cannot be construed as a limitation to this disclosure.

A person skilled in the art may understand that, the singular forms "a", "an", "said", and "the" used herein may include the plural forms as well, unless the context clearly indicates otherwise. It is to be further understood that, the terms "include" and/or "comprise" used in this specification of this disclosure refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of and all combinations of one or more related listed items.

To make objectives, technical solutions, and advantages of this disclosure clearer, the following further describes in detail embodiments of this disclosure with reference to the accompanying drawings.

First, several terms involved in this disclosure are introduced and explained.

NWDAF: Network data analytics function.
NF: Network function.
NRF: Network repository function.
AF: Application function.
OAM: Operation administration and maintenance.
SCP: Service communication proxy.
S-NSSAI: Single network slice selection assistance information.
Analytics ID: A type identifier of a network data analysis service.

Figure 1:
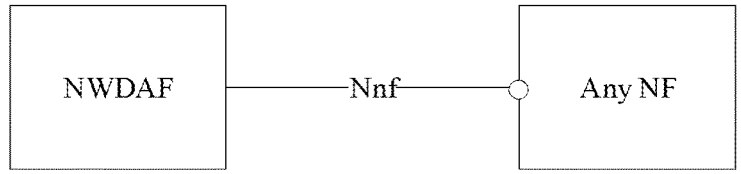
FIG. 1 is a schematic diagram of data collection of an NWDAF.
Figure 2:
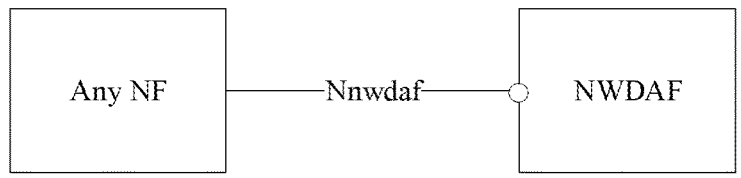
FIG. 2 is a schematic diagram of opening of analysis data of an NWDAF.

An architecture of the NWDAF may be shown in FIG. 1 and FIG. 2. FIG. 1 is a schematic diagram of data collection of an NWDAF. FIG. 2 is a schematic diagram of opening of analysis data (service analysis results) performed by an NWDAF. Specifically, the NWDAF may collect specific data from a specific NF, OAM, or AF, obtain a certain analysis result by using a certain big data analysis network element, and transmit the result to the specific NF, OMA, or AF as required. Currently, when selecting an NWDAF, only scenarios and requirements of big data analysis are considered generally, and it is difficult to obtain an optimal NWDAF. In FIG. 1, an Nnf interface may be called by the NWDAF, so that the NWDAF can receive data from any NF. In FIG. 2, an Nnwdaf is a servitization interface provided by the NWDAF network element.

In the eNA study of R16, for different scenarios, which network functions the NWDAF needs to collect data from and which network functions need to be transmitted with analysis results for using are proposed, and a specific implementation procedure for a particular scenario is defined, while a big data analysis algorithm adopted by the NWDAF for each network data analysis service is not standardized. Therefore, each network data analysis service of the same NWDAF network element may correspond to a specific NWDAF algorithm, and when different NWDAF network elements analyze the same network data analysis service (that is, the same scenario and requirement), corresponding processing times and accuracy of obtained analysis results also vary greatly because adopted big data analysis algorithms and used training samples may be different. In other words, when different NWDAF network elements analyze the same network data analysis service, the different NWDAF network elements have different performances (for example, analysis times and accuracy of analysis results). When it is required to select one NWDAF network element from the NWDAF network elements to provide a network data analysis service to an NWDAF service request network element, generally, a matched NWDAF network element is selected to provide the network data analysis service to the NWDAF service request network element by considering an Analytics Id(s) included in a service discovery request transmitted by the NWDAF service request network element, and probably included S-NSSAI, and/or service region information of the network element. However, the NWDAF network element selected by using the foregoing solution can only provide the network data analysis service to the NWDAF service request network element, and performance of performing network data analysis cannot be ensured.

Figure 3:
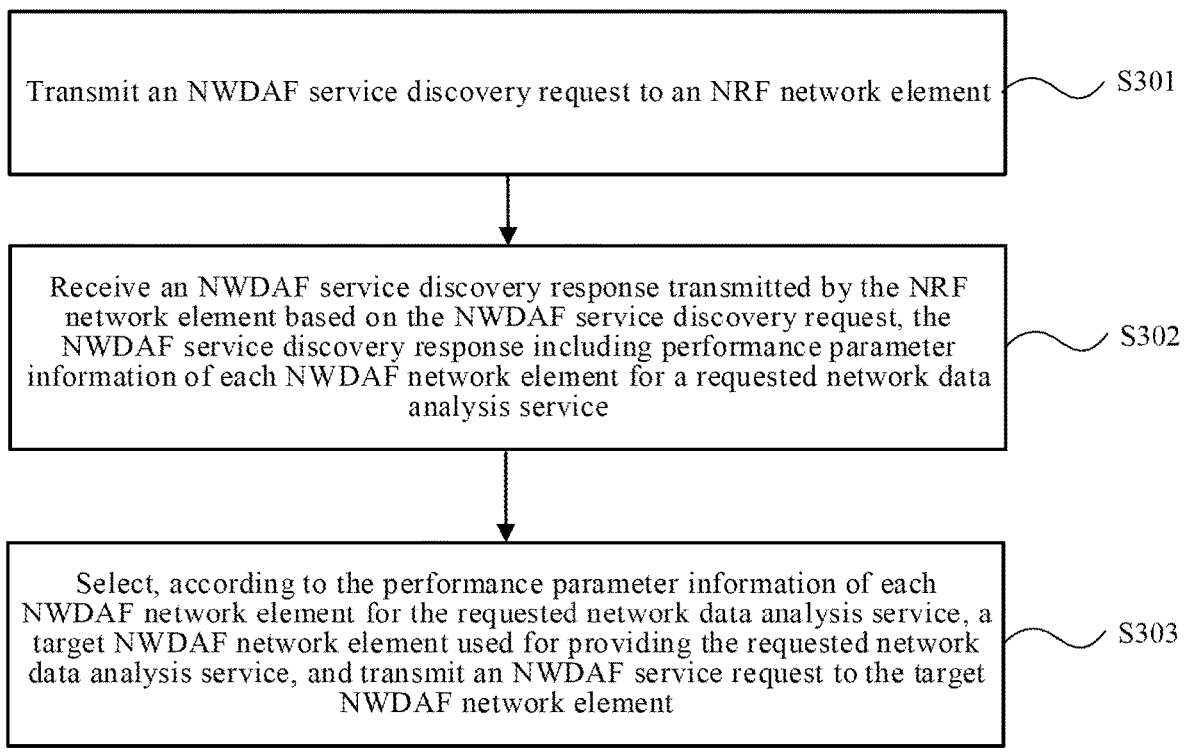
FIG. 3 is a schematic flowchart of an NWDAF network element selection method according to an embodiment of this disclosure.

For the foregoing problem, an embodiment of this disclosure provides an NWDAF network element selection method. FIG. 3 is a schematic flowchart of an NWDAF network element selection method according to an embodiment of this disclosure. As shown in FIG. 3, an execution entity of the method may be an NWDAF service request network element located on the electronic device or an SCP entity corresponding to the NWDAF service request network element. For ease of description, the execution entity is referred to as an NWDAF service requester in the following. As shown in FIG. 3, the method may include the following steps.

In step S301: an NWDAF service discovery request is transmitted to an NRF network element.

The NRF network element stores profile information of a corresponding NWDAF network element in NWDAF network elements registered on the NRF network element. In addition to an S-NSSAI of a network slice corresponding to the corresponding NWDAF network element, an Analytics ID(s) of each network data analysis service supported by the corresponding NWDAF network element, service region information of the corresponding NWDAF network element, and other information, the profile information further includes performance parameter information of the corresponding NWDAF network element for supported network data analysis services.

Specifically, a network slice corresponding to an NWDAF network element may be determined according to an S-NSSAI corresponding to the NWDAF network element. A type of a network data analysis service supported by an NWDAF network element may be determined according to an Analytics Id(s) corresponding to the NWDAF network element. It may be understood that, because each NWDAF network element may support one or more types of network data analysis services, each NWDAF network element corresponds to one or more Analytics ID(s), and a type identifier of a network data analysis service supported by an NWDAF network element may be represented by using "Analytics ID(s)". Further, when an NWDAF network element only corresponds to one Analytics ID, the Analytics ID is used for representation, and when an NWDAF network element corresponds to a plurality of Analytics IDs, the Analytics IDs is used for representation. Service region information of an NWDAF network element may be used for determining a service region of the NWDAF network element, for example, the service region information may be tracking region list information. Performance parameter information of an NWDAF network element for different network data analysis services may be used for representing performance when the NWDAF network element performs data analysis on the different network data analysis services.

An NWDAF service discovery request includes an NWDAF service discovery parameter, and the NWDAF service discovery parameter includes an Analytics ID of a request network data analysis service. In this embodiment of this disclosure, The NWDAF service discovery parameter may further include, for example, an S-NSSAI of a network slice of a target NWDAF network element, and/or service region information of the target NWDAF network element.

In step S302: an NWDAF service discovery response transmitted by the NRF network element based on the NWDAF service discovery request is received. The NWDAF service discovery response includes performance parameter information of each NWDAF network element for a requested network data analysis service.

Specifically, after the NWDAF service requester transmits an NWDAF service discovery request to the NRF network element, the NRF network element compares stored profile information of each NWDAF network element with an NWDAF service discovery parameter in a received NWDAF service discovery request, and uses each NWDAF network element whose profile information matching the discovery parameter to determine an alternative NWDAF network element of the target NWDAF network element subsequently. The foregoing comparison process may be understood as a process in which the NRF network element performs preliminary screening on the NWDAF network elements according to the discovery parameter in the NRF network element, to obtain each alternative NWDAF network element.

Then, the NRF network element transmits performance parameter information of each alternative NWDAF network element for a requested network data analysis service and an identifier of each alternative NWDAF network element to the NWDAF service requester by using the NWDAF service discovery response. In actual applications, the NRF network element may store the performance parameter and identifier corresponding to the each alternative NWDAF network element in an NWDAF performance list in one-to-one correspondence, and then transmits the NWDAF performance list to the NWDAF service requester. Alternatively, the NRF network element directly transmits the profile information of each alternative NWDAF network element to the NWDAF service requester by using the NWDAF service discovery response. It may be understood that, in addition to the foregoing mentioned information, the profile information of the NWDAF network element further includes an identifier of the NWDAF network element.

It may be understood that, when an NWDAF service discovery parameter only includes an Analytics ID of a requested network data analysis service, a matching between profile information of an NWDAF network element and a discovery parameter refers to that: a network data analysis service supported by the NWDAF network element includes a network data analysis service requested by an NWDAF service requester, that is, Analytics Id(s) corresponding to the NWDAF network element include an Analytics ID corresponding to the network data analysis service requested by the NWDAF service requester. When the NWDAF service discovery parameter further includes an S-NSSAI of a target NWDAF network element and service region information of the target NWDAF network element, the matching between the profile information of the NWDAF network element and the discovery parameter refers to that: in addition to that the Analytics Id(s) corresponding to the NWDAF network element include the Analytics ID corresponding to the network data analysis service requested by the NWDAF service requester, the S-NSSAI and service region information corresponding to the NWDAF network element are the same as an S-NSSAI and service region information in the discovery parameter.

After performing preliminary screening on the NWDAF network element by using the foregoing methods, it can be ensured that the obtained alternative NWDAF network elements can provide a network data analysis service to the NWDAF service request network element.

In step S303: according to the performance parameter information of each NWDAF network element for the requested network data analysis service, a target NWDAF network element used for providing the requested network data analysis service is selected. Then, an NWDAF service request is transmitted to the target NWDAF network element.

Because different alternative NWDAF network elements have different performance parameter information for a requested network data analysis service, and a performance parameter can represent performance when an NWDAF network element performs data analysis on a requested network data analysis service, a performance parameter may be used as a basis for selecting a target NWDAF network element.

Specifically, after receiving the NWDAF service discovery response, the NWDAF service requester further determines the target NWDAF network element according to performance parameter information in the NWDAF service discovery response. After determining the target NWDAF network element, the NWDAF service requester may transmit an NWDAF service request to the target NWDAF network element, and the NWDAF service request includes an identifier of the target NWDAF network element and an Analytics ID of the requested network data analysis service. After receiving the NWDAF service request, the target NWDAF network element transmits an NWDAF service response to the NWDAF service request network element (or the NWDAF service requester), and the NWDAF service response includes an analysis result of the target NWDAF network element for the requested network data analysis service.

To better describe solutions provided in the embodiments of this disclosure, the solutions is described in detail with specific examples in the following.

Figure 4:
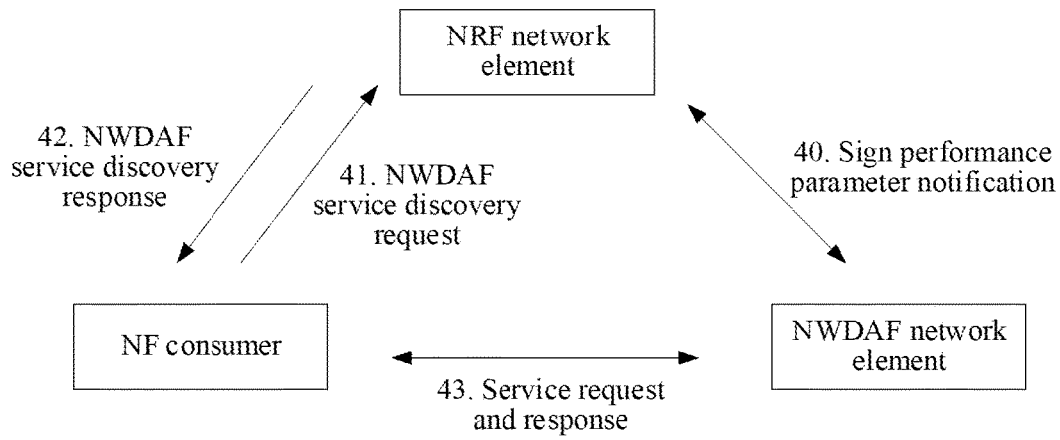
FIG. 4 is a schematic flowchart of an NWDAF network element selection method in an example according to an embodiment of this disclosure.

FIG. 4 is a schematic principle diagram of an NWDAF network element selection method according to this embodiment of this disclosure. As shown in FIG. 4, in this example, an NWDAF service requester is an NWDAF service request network element, and specifically, is an NF network element. In actual applications, the NWDAF network element may be understood as a service producer (or provider), and the NWDAF service request network element may be understood as a service consumer (or receiver). Therefore, an NF consumer in FIG. 4 corresponds to the NF network element in the solutions in this disclosure, and an execution process of the solutions in this example may include the following steps:

In step 41: An NF consumer transmits an NWDAF service discovery request to an NRF network element, the NWDAF service discovery request including an Analytics ID of a network data analysis service required by the NF consumer and other parameter information.

In step 42: The NRF network element transmits an NWDAF service discovery response to the NF consumer based on the NWDAF service discovery request, the NWDAF service discovery response including performance parameter information of each NWDAF network element, satisfying parameter information in a service discovery request, for the requested network data analysis service, and the NF consumer determines a target NWDAF network element according to the performance parameter information corresponding to the each NWDAF network element.

In step 43: The NF consumer transmits an NWDAF service request to the target NWDAF network element, the NWDAF service request including an Analytics ID of the requested network data analysis service, and after receiving the NWDAF service request, the target NWDAF network element transmits an NWDAF service response to the NWDAF service request network element (that is, the NF consumer in FIG. 4), the NWDAF service response including an analysis result of the target NWDAF network element for the requested network data analysis service.

According to the solutions provided in this embodiment of this disclosure, before an NWDAF service request is transmitted to a target NWDAF network element, by transmitting an NWDAF service discovery request to an NRF network element, an NWDAF service discovery response including performance parameter information of each NWDAF network element satisfying parameter information in the service discovery request for a requested network data analysis service is obtained. Therefore, a most suitable target NWDAF network element is selected based on the performance parameter information corresponding to the each NWDAF network element, thereby ensuring performance when the selected target NWDAF network element analyzes the requested network data analysis service, and providing a basis for obtaining a best NWDAF result.

In this embodiment of this disclosure, step 40 of a sign performance parameter notification between the NRF network element and the NWDAF network element is further included.

In this embodiment of this disclosure, for each NWDAF network element, the performance parameter information includes an average predicted (or prediction) confidence of the NWDAF network element for a service analysis result of each network data analysis service; and the selecting, according to the performance parameter information of each NWDAF network element for the requested network data analysis service, a target NWDAF network element used for providing the requested network data analysis service includes:

determining an NWDAF network element having a maximum average predicted confidence for the requested network data analysis service in the NWDAF network elements included in the NWDAF service discovery response as the target NWDAF network element.

The performance parameter information is specifically an average predicted confidence of analysis results of each network data analysis service, that is, an average predicted confidence of the service analysis results is used for representing analysis performance of a corresponding NWDAF network element for the network data analysis service.

The predicted confidence is a probability that a truth value appears within a certain range by using a predicted value as a center. A predicted confidence of each NWDAF network element for a service analysis result represents reliability of a service analysis result predicted by each NWDAF network element.

Specifically, when the NWDAF service requester selects a target NWDAF network element according to an average predicted confidence corresponding to each alternative NWDAF network element for a requested network data analysis service, because a greater average predicted confidence indicates a more accurate service analysis result of the corresponding alternative NWDAF network element, that is, the corresponding alternative NWDAF network element has better performance. Then, an NWDAF network element having a maximum corresponding average predicted confidence in the alternative NWDAF network elements may be determined as the target NWDAF network element.

In this embodiment of this disclosure, for each NWDAF network element, the average predicted confidence of the NWDAF network element for each network data analysis service is determined by the NWDAF network element by using the following operations:

collecting statistics on historical predicted confidences of the NWDAF network element for each network data analysis service; and determining the average predicted confidence of the NWDAF network element for each network data analysis service based on the historical predicted confidences for each network data analysis service.

Because a corresponding big data analysis algorithm in the NWDAF network element is a data analysis algorithm based on machine learning, an accuracy of an analysis result of which for the same type of network data analysis service may change with an increase of a quantity of times of analysis. Generally, an accuracy of an analysis result increases with an increase of a quantity of times of analysis, and therefore, historical predicted confidences for the network data analysis service corresponding to the NWDAF network element are all different.

Specifically, after a network data analysis is performed, each NWDAF network element gives a predicted confidence of an analysis result at the same time, collects statistics on predicted confidences (that is, historical predicted confidences) corresponding to a certain quantity of times of network data analysis, and averages the confidences to obtain a corresponding average predicted confidence of the NWDAF network element for the network data analysis service.

In this embodiment of this disclosure, the method is performed by an NWDAF service request network element or an SCP entity corresponding to the NWDAF service request network element. The NWDAF service request network element includes an NF network element, an AF network element, or an OAM.

If the method is performed by an SCP entity, the NWDAF service request network element is in indirect communication with the NRF network element when this solution is performed. The transmitting an NWDAF service discovery request to the NRF network element includes:

receiving an NWDAF service request transmitted by the NWDAF service request network element, the NWDAF service request including an Analytics ID of a requested network data analysis service; and transmitting an NWDAF service discovery request to the NRF network element based on the NWDAF service request.

Further, after the selecting a target NWDAF network element used for providing the requested network data analysis service, the method further includes:

transmitting the NWDAF service request to the target NWDAF network element; and receiving an NWDAF service response of the target NWDAF network element for the NWDAF service request, and transmitting the NWDAF service response to the NWDAF service request network element.

When the method is performed by an NWDAF service request network element, the NWDAF service request network element is in direct communication with an NRF network element when this solution is performed. When the method is performed by an SCP entity corresponding to an NWDAF service request network element, the corresponding SCP entity is in communication with an NRF network element, and the NWDAF service request network element is in communication with the corresponding SCP entity when this solution is performed.

Specifically, when the method is performed by an SCP entity, the SCP entity may be understood as a relay server. Then, an Analytics ID of a required network data analysis service is from the NWDAF service request network element, and an analysis result provided by the determined target NWDAF network element is also finally transmitted to the NWDAF service request network element for using.

In other words, the SCP entity is in communication with the NWDAF service request network element. The SCP entity first receives an NWDAF service request transmitted by the NWDAF service request network element, the request including an Analytics ID of a requested network data analysis service. In this embodiment of this disclosure, the request also includes an S-NSSAI and service region information of an NWDAF network element required to be selected. In the process of determining the target NWDAF network element, as an execution entity, the SCP entity is in communication with the NRF network element according to the foregoing described method, and determines the target NWDAF network element. The S-NSSAI and service region information included in the NWDAF service discovery parameter included in the NWDAF service discovery request transmitted by the SCP entity to the NRF network element is information of an NWDAF required to be selected, and is corresponding to the S-NSSAI and service region information included in the service request transmitted by the NWDAF service request network element. However, the Analytics ID included in the NWDAF service discovery parameter is also the Analytics ID included in the service request transmitted by the corresponding NWDAF service request network element. After determining the target NWDAF network element, the SCP entity and the target NWDAF network element are in communication to obtain an analysis result provided by the target NWDAF network element for the network data analysis service, and transmits the analysis result to the NWDAF service request network element.

It may be understood that, the NWDAF service request transmitted by the NWDAF service request network element to the SCP entity and the NWDAF service request transmitted by the SCP entity to the NWDAF network element include different information. The NWDAF service request transmitted by the NWDAF service request network element to the SCP entity includes a type identifier of a requested network data analysis service. In this embodiment of this disclosure, The NWDAF service request transmitted by the NWDAF service request network element to the SCP entity may further include an S-NSSAI and service region information of an NWDAF network element required to be selected. The NWDAF service request transmitted by the SCP entity to the NWDAF network element only includes an identifier of a requested network data analysis service, and does not include an S-NSSAI and service region information.

In this embodiment of this disclosure, the NWDAF service discovery response further includes a valid duration of a service analysis result of each NWDAF network element for the requested network data analysis service; and during transmitting a next NWDAF service request for the requested network data analysis service and in a case that a time difference between a transmission time of the next NWDAF service request and a receiving time of the NWDAF service discovery response is not greater than the valid duration, the method may further include:

selecting a target NWDAF network element corresponding to the next NWDAF service request based on the performance parameter information of each NWDAF network element for the requested network data analysis service that is included in the NWDAF service discovery response.

Specifically, in a case of direct communication, the NWDAF service request network element may request the same network data analysis service for a plurality of times. In a case of indirect communication, in a plurality of NWDAF service request network elements corresponding to the same SCP entity, one NWDAF service request network element and another NWDAF service request network element may request the same network data analysis service. In the two cases, in the process of determining the target NWDAF network element according to the foregoing described method, both the NWDAF service request network element or the SCP entity need to be in communication with the NRF network element repeatedly, to obtain a performance parameter corresponding to each corresponding NWDAF network element.

Then, it may be considered that, in a preset duration (that is, a time difference between a transmission time of a next NWDAF service request and a receiving time of an NWDAF service discovery response is not greater than a valid duration) after the NRF network element transmits an NWDAF service discovery response, performance parameter information in the NWDAF service discovery response remains valid for the same network data analysis service, that is, the performance parameter information in the NWDAF service discovery response may be used as a basis for selecting a target NWDAF network element for the same network data analysis service within the preset duration. Therefore, a communication with the NRF network element does not need to be performed repeatedly, so as to improve running efficiency.

In this embodiment of this disclosure, the determining a target NWDAF network element corresponding to the next NWDAF service request based on the performance parameter information of each NWDAF network element for the requested network data analysis service that is included in the NWDAF service discovery response includes:

determining, in a case that an NWDAF service update notification transmitted by the NRF network element is not received, the target NWDAF network element corresponding to the next NWDAF service request based on the performance parameter information of each NWDAF network element for the requested network data analysis service that is included in the NWDAF service discovery response, the NWDAF service update notification including an identifier of an NWDAF network element with a changed performance parameter, and an updated value of performance parameter information of the NWDAF network element with a changed performance parameter for the requested network data analysis service; and determining, in a case that the NWDAF service update notification transmitted by the NRF network element is received, the target NWDAF network element corresponding to the next NWDAF service request based on the updated value of the performance parameter information of the NWDAF network element for the requested network data analysis service.

Although it may be considered that, in the preset duration after the NRF network element transmits the NWDAF service discovery response, the performance parameter information in the NWDAF service discovery response remains valid for the same network data analysis service, in the preset duration after the NRF network element transmits the NWDAF service discovery response, if performance parameter information of any NWDAF network element for the requested network data analysis service is changed, to ensure validity of the performance parameter information, the any NWDAF network element transmits the changed performance parameter information of the network data analysis service to the NRF network element. The NRF network element stores the changed information transmitted by the NWDAF network element, and transmits the changed performance parameter information corresponding to the NWDAF network element to the NWDAF service request network element or SCP entity that have received the performance parameter information of the NWDAF network element by using the NWDAF service update notification.

Specifically, if an NWDAF service update notification is not received, it is considered that performance parameter information of each NWDAF network element for the requested network data analysis service is not changed, and the target NWDAF network element corresponding to the next NWDAF service request is determined based on the performance parameter information of each NWDAF network element for the requested network data analysis service that is included in the NWDAF service discovery response. If an NWDAF service update notification for any NWDAF network element is received, it is considered that performance parameter information of the NWDAF network element for the requested network data analysis service is changed. An NWDAF network element needed to be updated is determined according to an identifier of an NWDAF network element whose performance parameter is changed in the service update notification, and performance parameter information of the NWDAF network element stored in the service discovery response is replaced with performance parameter information of the NWDAF network element included in the service update notification. The target NWDAF network element corresponding to the next NWDAF service request is determined based on the performance parameter information of each updated NWDAF network element for the requested network data analysis service.

It may be understood that, if the time difference between the transmission time of the next NWDAF service request and the receiving time of the NWDAF service discovery response is greater than the valid duration, the NWDAF service request network element or the SCP entity needs to retransmits the NWDAF service discovery request to the NRF network element, and determines the target NWDAF network element used for providing the requested network data analysis service according to the performance parameter information corresponding to each NWDAF network element in the NWDAF service discovery response transmitted by the NRF network element.

Figure 5:
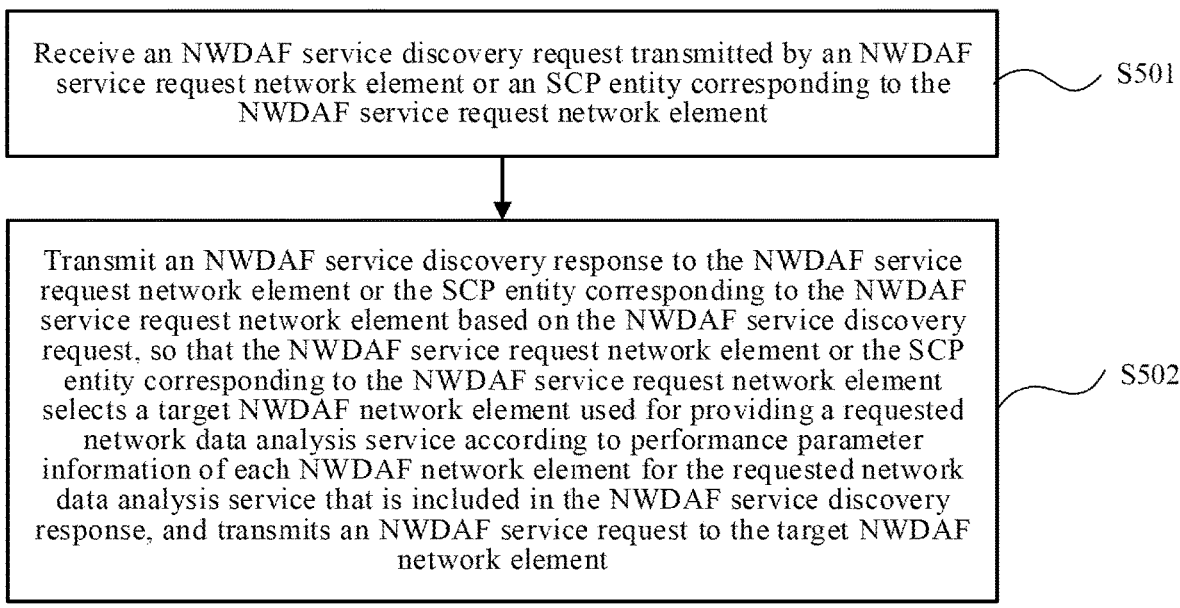
FIG. 5 is a schematic flowchart of an NWDAF network element selection method according to an embodiment of this disclosure.

FIG. 5 is a schematic flowchart of an NWDAF network element selection method according to an embodiment of this disclosure. As shown in FIG. 5, the method may be performed by an NRF network element located on an electronic device, and the method may include the following steps:

In step S501: an NWDAF service discovery request transmitted by an NWDAF service request network element or an SCP entity corresponding to the NWDAF service request network element is received.

The NRF network element stores profile information of a corresponding NWDAF network element in NWDAF network elements registered on the NRF network element. In addition to an S-NSSAI of a network slice corresponding to the corresponding NWDAF network element, an Analytics ID(s) of each network data analysis service supported by the corresponding NWDAF network element, service region information of the corresponding NWDAF network element, and other information, the profile information further includes performance parameter information of the corresponding NWDAF network element for supported network data analysis services.

Specifically, a network slice corresponding to an NWDAF network element may be determined according to an S-NSSAI corresponding to the NWDAF network element. A type of a network data analysis service supported by an NWDAF network element may be determined according to an Analytics Id(s) corresponding to the NWDAF network element. It may be understood that, because each NWDAF network element may support one or more types of network data analysis services, each NWDAF network element corresponds to one or more Analytics ID(s), and a type identifier of a network data analysis service supported by an NWDAF network element may be represented by using "Analytics ID(s)". Further, when an NWDAF network element only corresponds to one Analytics ID, the Analytics ID is used for representation, and when an NWDAF network element corresponds to a plurality of Analytics IDs, the Analytics IDs is used for representation. Service region information of an NWDAF network element may be used for determining a service region of the NWDAF network element, for example, the service region information may be tracking region list information. Performance parameter information of an NWDAF network element for different network data analysis services may be used for representing performance when the NWDAF network element performs data analysis on the different network data analysis services.

An NWDAF service discovery request includes an NWDAF service discovery parameter, and the NWDAF service discovery parameter includes an Analytics ID of a request network data analysis service. In this embodiment of this disclosure, The NWDAF service discovery parameter may further include, for example, an S-NSSAI of a network slice of a target NWDAF network element, and/or service region information of the target NWDAF network element.

In step S502: an NWDAF service discovery response is transmitted to the NWDAF service request network element or the SCP entity corresponding to the NWDAF service request network element based on the NWDAF service discovery request, so that the NWDAF service request network element or the SCP entity corresponding to the NWDAF service request network element selects a target NWDAF network element used for providing a requested network data analysis service according to performance parameter information of each NWDAF network element for the requested network data analysis service that is included in the NWDAF service discovery response, and transmits an NWDAF service request to the target NWDAF network element.

Specifically, after the NWDAF service requester transmits an NWDAF service discovery request to the NRF network element, the NRF network element compares stored profile information of each NWDAF network element with an NWDAF service discovery parameter in a received NWDAF service discovery request, and uses each NWDAF network element whose profile information matching the discovery parameter to determine an alternative NWDAF network element of the target NWDAF network element subsequently. The foregoing comparison process may be understood as a process in which the NRF network element performs preliminary screening on the NWDAF network elements according to the discovery parameter in the NRF network element, to obtain each alternative NWDAF network element.

Then, the NRF network element transmits performance parameter information of each alternative NWDAF network element for a requested network data analysis service and an identifier of each alternative NWDAF network element to the NWDAF service requester by using the NWDAF service discovery response. In actual applications, the NRF network element may store the performance parameter and identifier corresponding to the each alternative NWDAF network element in an NWDAF performance list in one-to-one correspondence, and then transmits the NWDAF performance list to the NWDAF service requester. Alternatively, the NRF network element directly transmits the profile information of each alternative NWDAF network element to the NWDAF service requester by using the NWDAF service discovery response. It may be understood that, in addition to the foregoing mentioned information, the profile information of the NWDAF network element further includes an identifier of the NWDAF network element.

It may be understood that, when an NWDAF service discovery parameter only includes an Analytics ID of a requested network data analysis service, a matching between profile information of an NWDAF network element and a discovery parameter refers to that: a network data analysis service supported by the NWDAF network element includes a network data analysis service requested by an NWDAF service requester, that is, Analytics Id(s) corresponding to the NWDAF network element include an Analytics ID corresponding to the network data analysis service requested by the NWDAF service requester. When the NWDAF service discovery parameter further includes an S-NSSAI of a target NWDAF network element and service region information of the target NWDAF network element, the matching between the profile information of the NWDAF network element and the discovery parameter refers to that: in addition to that the Analytics Id(s) corresponding to the NWDAF network element include the Analytics ID corresponding to the network data analysis service requested by the NWDAF service requester, the S-NSSAI and service region information corresponding to the NWDAF network element are the same as an S-NSSAI and service region information in the discovery parameter.

After performing preliminary screening on the NWDAF network element by using the foregoing methods, it can be ensured that the obtained alternative NWDAF network elements can provide a network data analysis service to the NWDAF service request network element.

Because different alternative NWDAF network elements have different performance parameter information for a requested network data analysis service, and a performance parameter can represent performance when an NWDAF network element performs data analysis on a requested network data analysis service, a performance parameter may be used as a basis for selecting a target NWDAF network element.

Specifically, after receiving the NWDAF service discovery response, the NWDAF service requester further determines the target NWDAF network element according to performance parameter information in the NWDAF service discovery response. After determining the target NWDAF network element, the NWDAF service requester may transmit an NWDAF service request to the target NWDAF network element, and the NWDAF service request includes an identifier of the target NWDAF network element and an Analytics ID of the requested network data analysis service. After receiving the NWDAF service request, the target NWDAF network element transmits an NWDAF service response to the NWDAF service request network element (or the NWDAF service requester), and the NWDAF service response includes an analysis result of the target NWDAF network element for the requested network data analysis service.

According to the solutions provided in this embodiment of this disclosure, before an NWDAF service request is transmitted to a target NWDAF network element, by transmitting an NWDAF service discovery request to an NRF network element, an NWDAF service discovery response including performance parameter information of each NWDAF network element satisfying parameter information in the service discovery request for a requested network data analysis service is obtained. Therefore, a most suitable target NWDAF network element is selected based on the performance parameter information corresponding to the each NWDAF network element, thereby ensuring performance when the selected target NWDAF network element analyzes the requested network data analysis service, and providing a basis for obtaining a best NWDAF result.

In this embodiment of this disclosure, the method is performed by an NRF network element, the NRF network element signs the performance parameter notification information of each NWDAF network element, and the method may further include the following steps:

receiving performance parameter notification information transmitted by each NWDAF network element, the performance parameter notification information including performance parameter information of each NWDAF network element for each network data analysis service supported by each NWDAF network element; and storing the performance parameter information of each NWDAF network element for each network data analysis service supported by each NWDAF network element.

When there is a small quantity of NWDAF network elements, the NWDAF service request network element (an NF network element, an AF network element, an OAM, or the like) may alternatively configure profile information of each NWDAF network element directly, and sign performance parameter notification information of each NWDAF network element, without a procedure of service discovery request and response by using an NRF network element. Then, the NWDAF service request network element may directly obtain an update notification of performance parameter information of each NWDAF network element for each network data analysis service supported by each NWDAF network element, and replace the previously stored parameter information, further to determine the target NWDAF network element according to the foregoing described method.

In this embodiment of this disclosure, the NRF network element signs performance parameter change notification information of the NWDAF network element, and the method may further include the following steps:

receiving performance parameter change notification information transmitted by each NWDAF network element; and updating corresponding stored performance parameter information of the each NWDAF network element for a corresponding network data analysis service based on the performance parameter change notification information.

The performance parameter change notification information includes an identifier of the NWDAF network element, an Analytics Id(s) of a network data analysis service supported by the NWDAF network element, and performance parameter information of the NWDAF network element for each network data analysis service.

Specifically, the NRF network element signs the performance parameter information change notification information of the NWDAF network element. When performance parameter information corresponding to an NWDAF network element in the NWDAF network elements is changed, the NWDAF network element transmits an identifier of each changed NWDAF network element, an Analytics ID of a network data analysis service supported by the changed NWDAF network element, and performance parameter information of the changed NWDAF network element for each network data analysis service to the NRF network element, for updating corresponding information in the NRF network element.

In this embodiment of this disclosure, for each NWDAF network element, the performance parameter information includes an average predicted confidence of the NWDAF network element for a service analysis result of each network data analysis service; and the target NWDAF network element is an NWDAF network element having a maximum average predicted confidence for the requested network data analysis service in the NWDAF network elements included in the NWDAF service discovery response.

The performance parameter information is specifically an average predicted confidence of data analysis results of each network data analysis service, that is, an average predicted confidence of the data analysis results is used for representing analysis performance of a corresponding NWDAF network element for the network data analysis service.

The predicted confidence is a probability that a truth value appears within a certain range by using a predicted value as a center. A predicted confidence of data analysis results of each NWDAF network element for each network data analysis service represents reliability of the data analysis results of each NWDAF network element for each network data analysis service.

Specifically, when the NWDAF service requester selects a target NWDAF network element according to an average predicted confidence corresponding to each alternative NWDAF network element for a requested network data analysis service, because a greater average predicted confidence indicates a more accurate and reliable data analysis result of the corresponding alternative NWDAF network element for the requested data service, that is, the corresponding alternative NWDAF network element has better performance for the requested network data analysis service. Then, an NWDAF network element having a maximum average predicted confidence for the requested network data analysis service in the alternative NWDAF network elements may be determined as the target NWDAF network element.

In this embodiment of this disclosure, the NWDAF service discovery response further includes a valid duration of a service analysis result of each NWDAF network element for the requested network data analysis service; and when performance parameter change notification information is received at a time whose time difference with a transmission time of the NWDAF service discovery response is less than the valid duration, and the received performance parameter change notification information includes performance parameter information of at least one NWDAF network element for the requested network data analysis service that is included in the NWDAF service discovery response, the method further includes:

transmitting an NWDAF service update notification to the NWDAF service request network element or the SCP entity corresponding to the NWDAF service request network element, the NWDAF service update notification including an identifier of an NWDAF network element with a changed performance parameter, and an updated value of performance parameter information of the NWDAF network element with a changed performance parameter for the requested network data analysis service.

Specifically, although it may be considered that, in the preset duration after the NRF network element transmits the NWDAF service discovery response, the performance parameter information in the NWDAF service discovery response remains valid for the same network data analysis service, in the preset duration after the NRF network element transmits the NWDAF service discovery response, if performance parameter information of any NWDAF network element for the network data analysis service is changed, to ensure validity and accuracy of the performance parameter information, the any NWDAF network element transmits the changed performance parameter information to the NRF network element, and the NRF network element transmits the changed performance parameter information corresponding to the NWDAF network element to the NWDAF service requester by using the NWDAF service update notification.

A communication interaction process involved in the NWDAF network element selection method provided in this application is further described with reference to FIG. 6 and FIG. 7.

Figure 6:
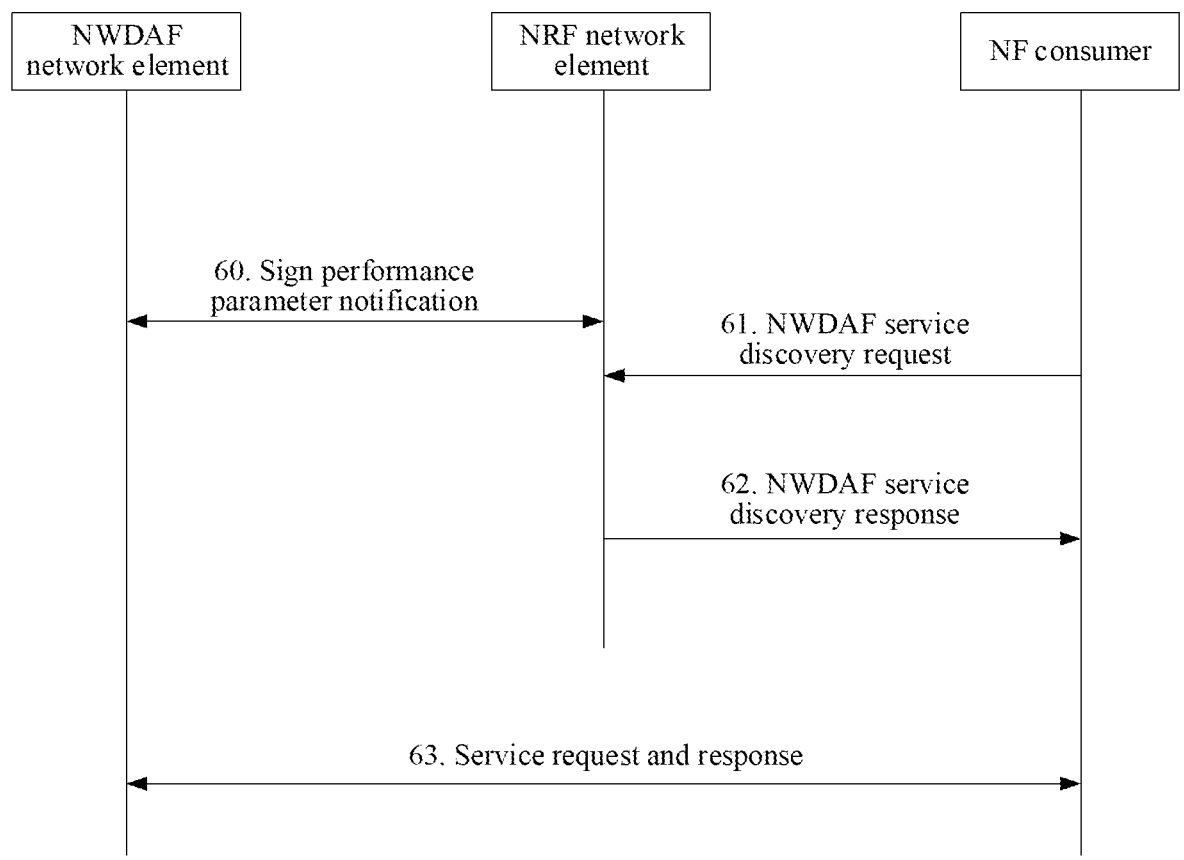
FIG. 6 is a communication interaction diagram in a case that an NWDAF network element selection method adopting direct communication according to an embodiment of this disclosure.

As shown in FIG. 6, the method is performed by an NF consumer (that is, the NWDAF service request network element mentioned in the foregoing), and for a direct communication solution in a network architecture, the entire service procedure involves an NWDAF network element end, an NRF network element end, and an NF consumer end. A service interaction process of the NWDAF network element may include the following steps:

In step 60: The NRF network element signs a performance parameter information change notification of the NWDAF network element, and in a case that performance parameter information of any network data analysis service in the NWDAF network element is changed, the NWDAF network element transmits the changed performance parameter to the NRF network element.

In step 61: The NF consumer transmits an NWDAF service discovery request to the NRF network element, an NWDAF service discovery parameter included in the NWDAF service discovery request including an Analytics ID of a requested network data analysis service. In this embodiment of this disclosure, for example, an S-NSSAI and/or service region information of an NWDAF network element required to be selected is further included.

In step 62: The NRF network element transmits an NWDAF service discovery response to the NF consumer based on the NWDAF service discovery request, the NWDAF service discovery response including performance parameter information of each NWDAF network element for the requested network data analysis service.

In step 63: The NF consumer selects a target NWDAF network element according to the performance parameter information of each NWDAF network element for the requested network data analysis service, and transmits an NWDAF service request to the target NWDAF network element, the NWDAF service request including an identifier of the requested network data analysis service. The target NWDAF network element transmits an NWDAF service response to the NF consumer based on the NWDAF service request, the NWDAF service response including an analysis result of the target NWDAF network element for the requested network data analysis service.

Figure 7:
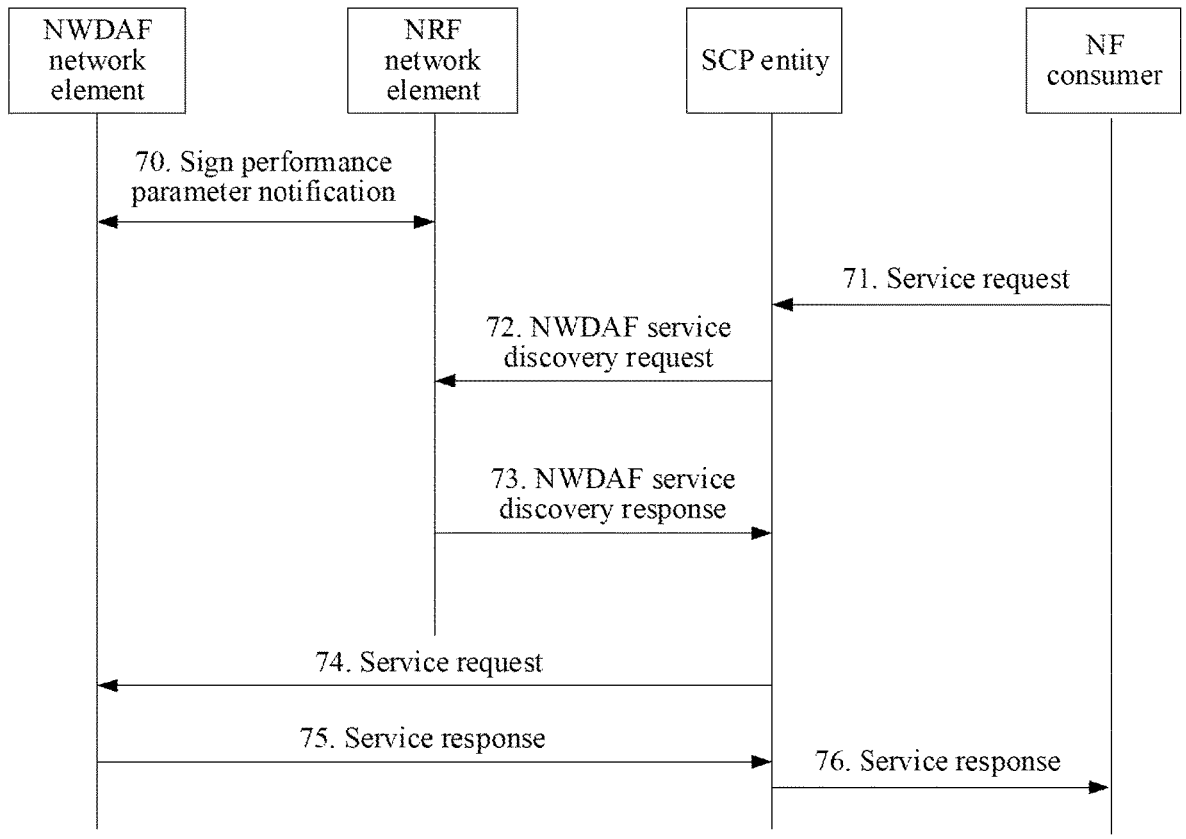
FIG. 7 is a communication interaction diagram in a case that an NWDAF network element selection method adopting indirect communication according to an embodiment of this disclosure.

As shown in FIG. 7, the method is performed by an SCP entity corresponding to the NF consumer, and for an indirect communication solution in a network architecture, the entire service procedure involves an NWDAF network element end, an NRF network element end, an SCP entity end, and an NF consumer end. A service interaction process of the NWDAF network element may include the following steps:

In step 70: The NRF network element signs a performance parameter information change notification of the NWDAF network element, and in a case that performance parameter information of any network data analysis service in the NWDAF network element is changed, the NWDAF network element transmits the changed performance parameter to the NRF network element.

In step 71: The NF consumer transmits an NWDAF service request to the SCP entity, the NWDAF service request including an identifier of a requested network data analysis service. In this embodiment of this disclosure, for example, an S-NSSAI and service region information of an NWDAF network element required to be selected is further included.

In step 72: The SCP entity transmits an NWDAF service discovery request to the NRF network element, an NWDAF service discovery parameter included in the NWDAF service discovery request including an Analytics ID of the network data analysis service requested by the NF consumer, and the S-NSSAI and service region information of an NWDAF network element required to be selected.

In step 73: The NRF network element transmits an NWDAF service discovery response to the SCP entity based on the NWDAF service discovery request, the NWDAF service discovery response including performance parameter information of each NWDAF network element for the requested network data analysis service.

In step 74: The SCP entity selects a target NWDAF network element according to the performance parameter information of each NWDAF network element for the requested network data analysis service included in the service discovery response, and transmits an NWDAF service request to the target NWDAF network element, the NWDAF service request including an identifier of the requested network data analysis service.

In step 75: The target NWDAF network element transmits an NWDAF service response to the SCP entity based on the NWDAF service request, the NWDAF service response including an analysis result of the target NWDAF network element for the requested network data analysis service.

In step 76. The SCP entity transmits the received NWDAF service response to the NF consumer.

Figure 8:
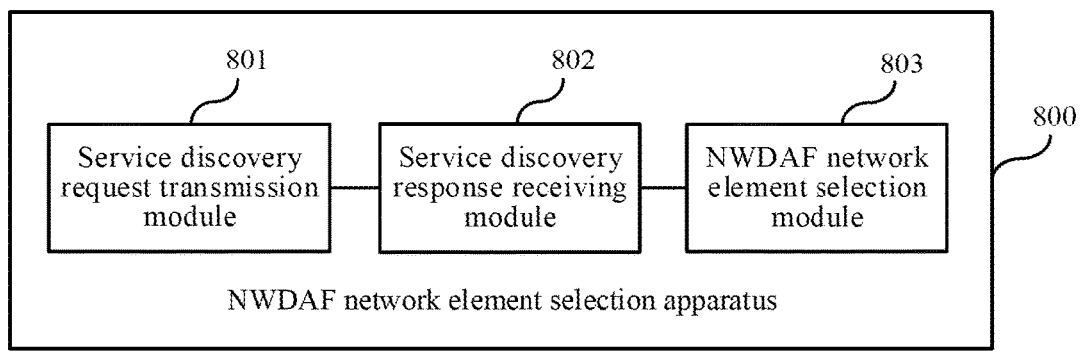
FIG. 8 is a structural block diagram of an NWDAF network element selection apparatus according to an embodiment of this disclosure.

FIG. 8 is a structural block diagram of an NWDAF network element selection apparatus according to an embodiment of this disclosure. As shown in FIG. 8, an apparatus 800 may include: a service discovery request transmission module 801, a service discovery response receiving module 802, and an NWDAF network element selection module 803. One or more modules of the apparatus 800 can be implemented by processing circuitry, software, or a combination thereof, for example.

The service discovery request transmission module 801 is configured to transmit an NWDAF service discovery request to an NRF network element.

The service discovery response receiving module 802 is configured to receive an NWDAF service discovery response transmitted by the NRF network element based on the NWDAF service discovery request, the NWDAF service discovery response including performance parameter information of each NWDAF network element for a requested network data analysis service.

The NWDAF network element selection module 803 is configured to: select, according to the performance parameter information of each NWDAF network element for the requested network data analysis service, a target NWDAF network element used for providing the requested network data analysis service, and transmit an NWDAF service request to the target NWDAF network element.

According to the solutions provided in this embodiment of this disclosure, before an NWDAF service request is transmitted to an NWDAF network element, by transmitting an NWDAF service discovery request to an NRF network element, an NWDAF service discovery response including performance parameter information of each NWDAF network element satisfying parameter information in the service discovery request for a requested network data analysis service can be obtained. Therefore, a most suitable target NWDAF network element is selected based on the performance parameter information corresponding to the each NWDAF network element, thereby ensuring performance when the selected target NWDAF network element analyzes the requested network data analysis service, and providing a basis for obtaining a best NWDAF result.

In this embodiment of this disclosure, for each NWDAF network element, the performance parameter information includes an average predicted confidence of the NWDAF network element for a service analysis result of each network data analysis service; and the NWDAF network element selection module 803 is specifically configured to:

determine an NWDAF network element having a maximum average predicted confidence for the requested network data analysis service in the NWDAF network elements included in the NWDAF service discovery response as the target NWDAF network element.

In this embodiment of this disclosure, the apparatus further includes an average predicted confidence determining module, configured to:

collect statistics on historical predicted confidences of the NWDAF network element for each network data analysis service; and determine the average predicted confidence of the NWDAF network element for each network data analysis service based on the historical predicted confidences for each network data analysis service.

In this embodiment of this disclosure, a method corresponding to the apparatus is performed by an NWDAF service request network element located on an electronic device or an SCP entity corresponding to the NWDAF service request network element. The NWDAF service request network element includes an NF network element, an AF network element, or an OAM.

If a method corresponding to the apparatus is performed by the SCP entity, the service discovery request transmission module 801 is specifically configured to:

receive an NWDAF service request transmitted by the NWDAF service request network element, the NWDAF service request including an Analytics ID of a requested network data analysis service; and transmit the NWDAF service discovery request to the NRF network element based on the NWDAF service request.

The apparatus may further include a service response forwarding module, configured to:

transmit, after the target NWDAF network element used for providing the requested network data analysis service, the NWDAF service request to the target NWDAF network element; and receive an NWDAF service response of the target NWDAF network element for the NWDAF service request, and transmitting the NWDAF service response to the NWDAF service request network element.

In this embodiment of this disclosure, the NWDAF service discovery response further includes a valid duration of a service analysis result of each NWDAF network element for the requested network data analysis service. The apparatus further includes a module for selecting a next target NWDAF network element, configured to:

select, during transmitting a next NWDAF service request for the requested network data analysis service and in a case that a time difference between a transmission time of the next NWDAF service request and a receiving time of the NWDAF service discovery response is not greater than the valid duration, a target NWDAF network element corresponding to the next NWDAF service request based on the performance parameter information of each NWDAF network element for the requested network data analysis service that is included in the NWDAF service discovery response.

In this embodiment of this disclosure, the module for selecting a next target NWDAF network element is specifically configured to:

determine, in a case that an NWDAF service update notification transmitted by the NRF network element is not received, the target NWDAF network element corresponding to the next NWDAF service request based on the performance parameter information of each NWDAF network element for the requested network data analysis service that is included in the NWDAF service discovery response, the NWDAF service update notification including an identifier of an NWDAF network element with a changed performance parameter, and an updated value of performance parameter information of the NWDAF network element with a changed performance parameter for the requested network data analysis service; and select, in a case that the NWDAF service update notification transmitted by the NRF network element is received, the target NWDAF network element corresponding to the next NWDAF service request based on the updated value of the performance parameter information of the NWDAF network element with a changed performance parameter for the requested network data analysis service included in the NWDAF service update notification.

Figure 9:
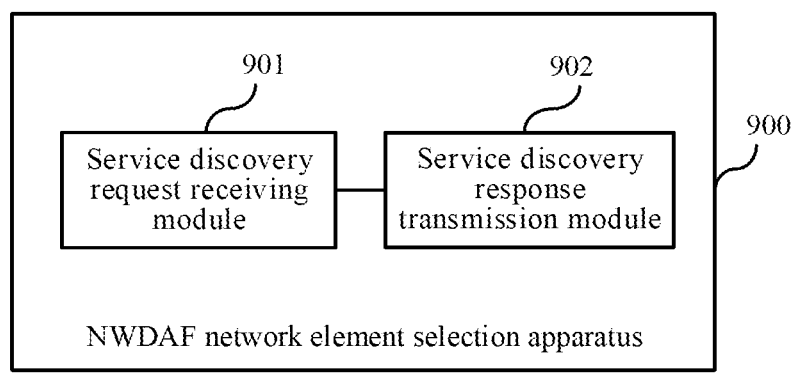
FIG. 9 is a structural block diagram of an NWDAF network element selection apparatus according to an embodiment of this disclosure.

FIG. 9 is a structural block diagram of an NWDAF network element selection apparatus according to an embodiment of this disclosure. As shown in FIG. 9, an apparatus 900 may include: a service discovery request receiving module 901 and a service discovery response transmission module 902. One or more modules of the apparatus 900 can be implemented by processing circuitry, software, or a combination thereof, for example.

The service discovery request receiving module 901 is configured to receive an NWDAF service discovery request transmitted by an NWDAF service request network element or an SCP entity corresponding to the NWDAF service request network element.

The service discovery response transmission module 902 is configured to transmit an NWDAF service discovery response to the NWDAF service request network element or the SCP entity corresponding to the NWDAF service request network element based on the NWDAF service discovery request, so that the NWDAF service request network element or the SCP entity corresponding to the NWDAF service request network element selects a target NWDAF network element used for providing a requested network data analysis service according to performance parameter information of each NWDAF network element for the requested network data analysis service that is included in the NWDAF service discovery response, and transmits an NWDAF service request to the target NWDAF network element.

According to the solutions provided in this embodiment of this disclosure, before an NWDAF service request is transmitted to an NWDAF network element, by transmitting an NWDAF service discovery request to an NRF network element, an NWDAF service discovery response including performance parameter information of each NWDAF network element satisfying parameter information in the service discovery request for a requested network data analysis service can be obtained. Therefore, a most suitable target NWDAF network element is selected based on the performance parameter information corresponding to the each NWDAF network element, thereby ensuring performance when the selected target NWDAF network element analyzes the requested network data analysis service, and providing a basis for obtaining a best NWDAF result.

In this embodiment of this disclosure, a method corresponding to the apparatus is performed by an NRF network element located on an electronic device, the NRF network element signs performance parameter notification information of each NWDAF network element, and the apparatus may further include a storage medium, configured to:

receive performance parameter notification information transmitted by each NWDAF network element, the performance parameter notification information including performance parameter information of each NWDAF network element for each network data analysis service supported by each NWDAF network element; and store the performance parameter information of each NWDAF network element for each network data analysis service supported by each NWDAF network element.

In this embodiment of this disclosure, the NRF network element signs performance parameter change notification information of each NWDAF network element, and the apparatus may further include an update module, configured to:

receive performance parameter change notification information transmitted by each NWDAF network element; and update corresponding stored performance parameter information of the each NWDAF network element for a corresponding network data analysis service based on the performance parameter change notification information.

In this embodiment of this disclosure, for each NWDAF network element, the performance parameter information includes an average predicted confidence of the NWDAF network element for a service analysis result of each network data analysis service; and the target NWDAF network element is an NWDAF network element having a maximum average predicted confidence for the requested network data analysis service in the NWDAF network elements included in the NWDAF service discovery response.

In this embodiment of this disclosure, the NWDAF service discovery response further includes a valid duration of a service analysis result of each NWDAF network element for the requested network data analysis service. The apparatus may further include a service update notification transmission module, configured to:

transmit, in a case that performance parameter change notification information is received at a time whose time difference with a transmission time of the NWDAF service discovery response is less than the valid duration, and the received performance parameter change notification information includes performance parameter information of at least one NWDAF network element for the requested network data analysis service that is included in the NWDAF service discovery response, an NWDAF service update notification to the NWDAF service request network element or the SCP entity corresponding to the NWDAF service request network element, the NWDAF service update notification including an identifier of an NWDAF network element with a changed performance parameter, and an updated value of performance parameter information of the NWDAF network element with a changed performance parameter for the requested network data analysis service.

Based on the same principle, an embodiment of this disclosure further provides an electronic device, including a memory, a processor, and a computer program stored in the memory and capable of being run on the processor, the processor, when performing the computer program, implementing the method according to any embodiment of this disclosure. The following cases may be specifically implemented.

Case 1: Transmit an NWDAF service discovery request to an NRF network element; receive an NWDAF service discovery response transmitted by the NRF network element based on the NWDAF service discovery request, the NWDAF service discovery response including performance parameter information of each NWDAF network element for a requested network data analysis service; and select, according to the performance parameter information of each NWDAF network element for the requested network data analysis service, a target NWDAF network element used for providing the requested network data analysis service, and transmit an NWDAF service request to the target NWDAF network element.

Case 2: Receive an NWDAF service discovery request transmitted by an NWDAF service request network element or an SCP entity corresponding to the NWDAF service request network element; and transmit an NWDAF service discovery response to the NWDAF service request network element or the SCP entity corresponding to the NWDAF service request network element based on the NWDAF service discovery request, so that the NWDAF service request network element or the SCP entity corresponding to the NWDAF service request network element determines a target NWDAF network element used for providing a requested network data analysis service according to performance parameter information of each NWDAF network element for the requested network data analysis service that is included in the NWDAF service discovery response, and transmits an NWDAF service request to the target NWDAF network element.

An embodiment of this disclosure further provides a computer-readable storage medium, storing a computer program, the program, when being executed by a processor, implementing the method shown in any embodiment of this disclosure.

It may be understood that the medium stores a computer program corresponding to the NWDAF network element selection method.

Figure 10:
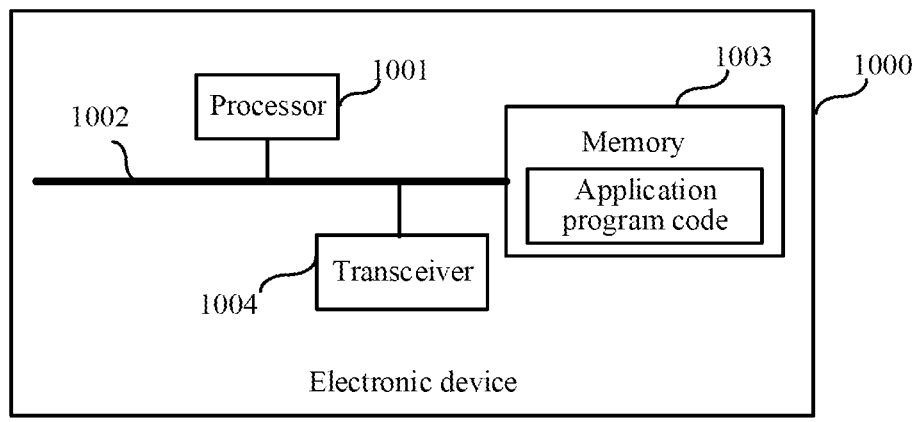
FIG. 10 is a schematic structural diagram of an electronic device according to an embodiment of this disclosure.

FIG. 10 is a schematic structural diagram of an electronic device adapted to an embodiment of this disclosure. As shown in FIG. 10, an electronic device 1000 includes: a processor 1001 and a memory 1003. The processor 1001 and the memory 1003 are connected, for example, are connected by using a bus 1002. Further, the electronic device 1000 may further include a transceiver 1004, and the electronic device 1000 may perform data exchange with another electronic device through the transceiver 1004. During actual application, there may be one or more transceivers 1004. The structure of the electronic device 1000 does not constitute a limitation on this embodiment of this disclosure.

The processor 1001 is applied in this embodiment of this disclosure, and may be configured to implement functions of the service discovery request transmission module 801, the service discovery response receiving module 802, and the NWDAF network element selection module 803 shown in FIG. 8, or configured to implement functions of the service discovery request receiving module 901 and the service discovery response transmission module 902 shown in FIG. 9.

The processor 1001 is an example of circuitry and may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or perform various examples of logic blocks, modules, and circuits described with reference to content disclosed in this disclosure. The processor 1001 may alternatively be a combination to implement a computing function, for example, may be a combination of one or more microprocessors, or a combination of a DSP and a microprocessor.

The bus 1002 may include a channel, to transmit information between the foregoing components. The bus 1002 may be a PCI bus, an EISA bus, or the like. The bus 1002 may be classified into an address bus, a data bus, a control bus, and the like. For ease of description, the bus in FIG. 10 is represented by using only one bold line, but this does not indicate that there is only one bus or one type of bus.

The memory 1003 may be a ROM or another type of static storage device that can store static information and a static instruction; or a RAM or another type of dynamic storage device that can store information and an instruction; or may be an EEPROM, a CD-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto.

The memory 1003 is configured to store application program codes for performing the solutions of this disclosure, and is controlled and executed by the processor 1001. The processor 1001 is configured to execute application codes stored in the memory 1003 to implement actions of the NWDAF network element selection apparatus provided in the embodiment shown in FIG. 8 or FIG. 9.

It is to be understood that, although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

The foregoing descriptions are some implementations of this disclosure. It is to be pointed out that a person of ordinary skill in the art may make several improvements or refinements without departing from the principle of this disclosure and the improvements or refinements shall fall within the protection scope of this disclosure.

What is claimed is:

1. A method for network data analytics, comprising:
   transmitting, from an electronic device in a fifth generation (5G) network, a network data analytics function (NWDAF) service discovery request to a network repository function (NRF) network element in the 5G network, the NWDAF service discovery request including a first analytics identification (ID) that indicates a requested network data analysis service in the 5G network, the NRF network element including profile information of a plurality of NWDAF network elements configured to provide network data analysis services in the 5G network, the profile information of each NWDAF network element in the plurality of NWDAF network elements including one or more analytics IDs respectively associated with one or more types of network data analysis service in the 5G network that are provided by the NWDAF network element;
   receiving, by the electronic device and from the NRF network element, an NWDAF service discovery response in response to the NWDAF service discovery request, the NWDAF service discovery response comprising performance parameter information of one or more NWDAF network elements for the requested network data analysis service in the 5G network, the performance parameter information of an NWDAF network element in the one or more NWDAF network elements indicating a performance capability of the NWDAF network element on the requested network data analysis service in the 5G network;
   selecting, by processing circuitry in the electronic device, according to the performance parameter information of the one or more NWDAF network elements for the requested network data analysis service, a target NWDAF network element to provide the requested network data analysis service associated with the first analytics ID; and
   transmitting, by the electronic device in the 5G network, an NWDAF service request to the target NWDAF network element, the NWDAF service request including the first analytics ID that identifies the requested network data analysis service.

2. The method according to claim 1, wherein the performance parameter information of the NWDAF network element includes an average prediction confidence that is an average of historical prediction confidences corresponding to predicted values predicted by the NWDAF network element for the requested network data analysis service, each of the historical prediction confidences is a probability that a truth value associated with the requested network data analysis service is within a range of the corresponding predicted value.

3. The method according to claim 2, wherein the selecting of the target NWDAF network element comprises:
   determining, by the processing circuitry, a specific NWDAF network element in the one or more NWDAF network elements with a maximum average prediction confidence for the requested network data analysis service to be the target NWDAF network element.

4. The method according to claim 2, wherein the average prediction confidence by the NWDAF network element for the requested network data analysis service is determined by the NWDAF network element based on the historical prediction confidences for the requested network data analysis service.

5. The method according to claim 1, wherein the transmitting the NWDAF service discovery request comprises:
   receiving, by the processing circuitry, an incoming NWDAF service request from an NWDAF service request network element, the incoming NWDAF service request comprising the first analytics ID that indicates the requested network data analysis service; and
   transmitting the NWDAF service discovery request to the NRF network element based on the incoming NWDAF service request.

6. The method according to claim 5, wherein after the selecting of the target NWDAF network element, the method further comprises:
   transmitting the NWDAF service request to the target NWDAF network element;
   receiving an NWDAF service response from the target NWDAF network element in response to the NWDAF service request; and
   transmitting the NWDAF service response to the NWDAF service request network element.

7. The method according to claim 1, wherein the NWDAF service discovery response further comprises a valid duration of an NWDAF network element in the one or more NWDAF network elements for a service analysis result of the requested network data analysis service; and
   the method further comprises:
   determining that a time difference between a transmission time of a following NWDAF service request and a receiving time of the NWDAF service discovery response is not greater than the valid duration;
   selecting the NWDAF network element as the target NWDAF network element for the following NWDAF service request based on the performance parameter information of the one or more NWDAF network elements for the requested network data analysis service; and
   transmitting the following NWDAF service request to the target NWDAF network element.

8. The method according to claim 1, further comprising:
   receiving an NWDAF service update notification from the NRF network element, the NWDAF service update notification comprising an identifier of an NWDAF network element for updating, and an updated value of the performance parameter information for the NWDAF network element; and
   selecting the target NWDAF network element for a following NWDAF service request based on the updated value of the performance parameter information for the NWDAF network element.

9. A method for network data analytics, comprising:
receiving, by processing circuitry in an electronic device of a network repository function (NRF) in a fifth generation (5G) network, a network data analytics function (NWDAF) service discovery request associated with an NWDAF service request network element in the 5G network, the NWDAF service discovery request including a first analytics identification (ID) that indicates a requested network data analysis service in the 5G network;
determining one or more NWDAF network elements for the requested network data analysis service according to profile information of a plurality of NWDAF network elements configured to provide network data analysis services in the 5G network, the profile information of each NWDAF network element in the plurality of NWDAF network elements including one or more analytics IDs respectively associated with one or more types of network data analysis service that are provided by the NWDAF network element; and
transmitting an NWDAF service discovery response in response to the NWDAF service discovery request, the NWDAF service discovery response comprising performance parameter information of the one or more NWDAF network elements for the requested network data analysis service in the 5G network, the performance parameter information of an NWDAF network element in the one or more NWDAF network elements indicating a performance capability of the NWDAF network element on the requested network data analysis service in the 5G network, the performance parameter information of the one or more NWDAF network elements being used to select a target NWDAF network element from the one or more NWDAF network elements to provide the requested network data analysis service.

10. The method according to claim 9, wherein the NWDAF service discovery request is transmitted from the NWDAF service request network element or a service communication proxy (SCP) entity corresponding to the NWDAF service request network element, and the NWDAF service discovery response is transmitted to the NWDAF service request network element or the SCP entity corresponding to the NWDAF service request network element.

11. The method according to claim 9, further comprising:
receiving a performance parameter notification transmitted by an NWDAF network element, the performance parameter notification comprising performance parameter information of a network data analysis service supported by the NWDAF network element; and
storing the performance parameter information of the network data analysis service supported by the NWDAF network element.

12. The method according to claim 11, further comprising:
receiving a performance parameter change notification transmitted by the NWDAF network element; and
updating the stored performance parameter information of the network data analysis service supported by the NWDAF network element based on the performance parameter change notification.

13. The method according to claim 9, wherein for an NWDAF network element in the one or more NWDAF network elements, the performance parameter information comprises an average prediction confidence of the NWDAF network element for the requested network data analysis service, the average prediction confidence is an average of historical prediction confidences corresponding to predicted values predicted by the NWDAF network element for the requested network data analysis service, each of the historical prediction confidences is a probability that a truth value associated with the requested network data analysis service is within a range of the corresponding predicted value; and
the target NWDAF network element is a specific NWDAF network element having a maximum average prediction confidence for the requested network data analysis service in the one or more NWDAF network elements.

14. The method according to claim 12, wherein the NWDAF service discovery response further comprises a valid duration of a NWDAF network element for the requested network data analysis service; and
the method further comprises:
determining that a time that the performance parameter change notification is received is within the valid duration from a transmission time of the NWDAF service discovery response; and
transmitting, an NWDAF service update notification, the NWDAF service update notification comprising an identifier of the NWDAF network element, and an updated value of performance parameter information of the NWDAF network element for the requested network data analysis service.

15. An apparatus for network data analytics in a fifth generation (5G) network, comprising processing circuitry configured to:
transmit a network data analytics function (NWDAF) service discovery request to a network repository function (NRF) network element in the 5G network, the NWDAF service discovery request including a first analytics identification (ID) that indicates a requested network data analysis service in the 5G network, the NRF network element including profile information of a plurality of NWDAF network elements configured to provide network data analysis services in the 5G network, the profile information of each NWDAF network element in the plurality of NWDAF network elements including one or more analytics IDs respectively associated with one or more types of network data analysis service that are provided by the NWDAF network element;
receive an NWDAF service discovery response in response to the NWDAF service discovery request, the NWDAF service discovery response comprising performance parameter information of one or more NWDAF network elements for the requested network data analysis service in the 5G network, the performance parameter information of an NWDAF network element in the one or more NWDAF network elements indicating a performance capability of the NWDAF network element on the requested network data analysis service in the 5G network;
select according to the performance parameter information of the one or more NWDAF network elements for the requested network data analysis service, a target NWDAF network element used to provide the requested network data analysis service associated with the first analytics ID; and
transmit an NWDAF service request to the target NWDAF network element, the NWDAF service request including the first analytics ID that identifies the requested network analysis service.

16. The apparatus according to claim 15, wherein the performance parameter information of the NWDAF network element includes an average prediction confidence that is an average of historical prediction confidences corresponding to predicted values by the NWDAF network element for the requested network data analysis service, each of the historical prediction confidences is a probability that a truth value associated with the requested network data analysis service is within a range of the corresponding predicted value.

17. The apparatus according to claim 16, wherein the processing circuitry is further configured to:
   determine a specific NWDAF network element in the one or more NWDAF network elements with a maximum average prediction confidence for the requested network data analysis service to be the target NWDAF network element.

18. The apparatus according to claim 15, wherein the processing circuitry is configured to:
   receive an incoming NWDAF service request from an NWDAF service request network element, the incoming NWDAF service request comprising a type identifier of the requested network data analysis service; and
   transmit the NWDAF service discovery request to the NRF network element based on the incoming NWDAF service request.

19. The apparatus according to claim 18, wherein after the target NWDAF network element is selected, the processing circuitry is configured to:
   transmit the NWDAF service request to the target NWDAF network element;
   receive an NWDAF service response from the target NWDAF network element in response to the NWDAF service request; and
   transmit the NWDAF service response to the NWDAF service request network element.

20. The apparatus according to claim 15, wherein the NWDAF service discovery response further comprises a valid duration of an NWDAF network element in the one or more NWDAF network elements for a service analysis result of the requested network data analysis service, and the processing circuitry is configured to:
   determine that a time difference between a transmission time of a following NWDAF service request and a receiving time of the NWDAF service discovery response is not greater than the valid duration;
   select the NWDAF network element as the target NWDAF network element for the following NWDAF service request based on the performance parameter information of the one or more NWDAF network elements for the requested network data analysis service; and
   transmit the following NWDAF service request to the target NWDAF network element.

\* \* \* \* \*